United States Patent Office 2,710,745
Patented June 14, 1955

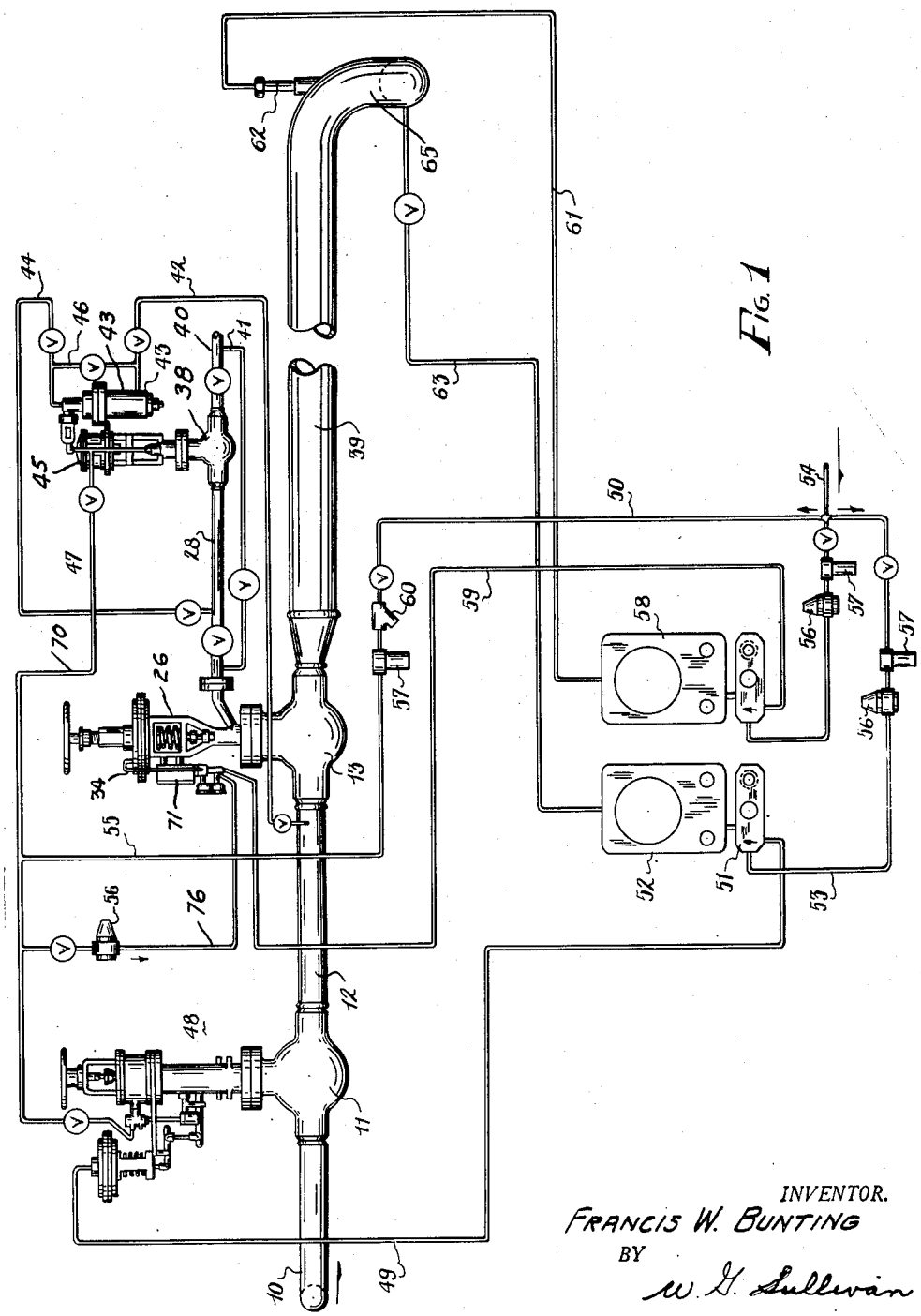

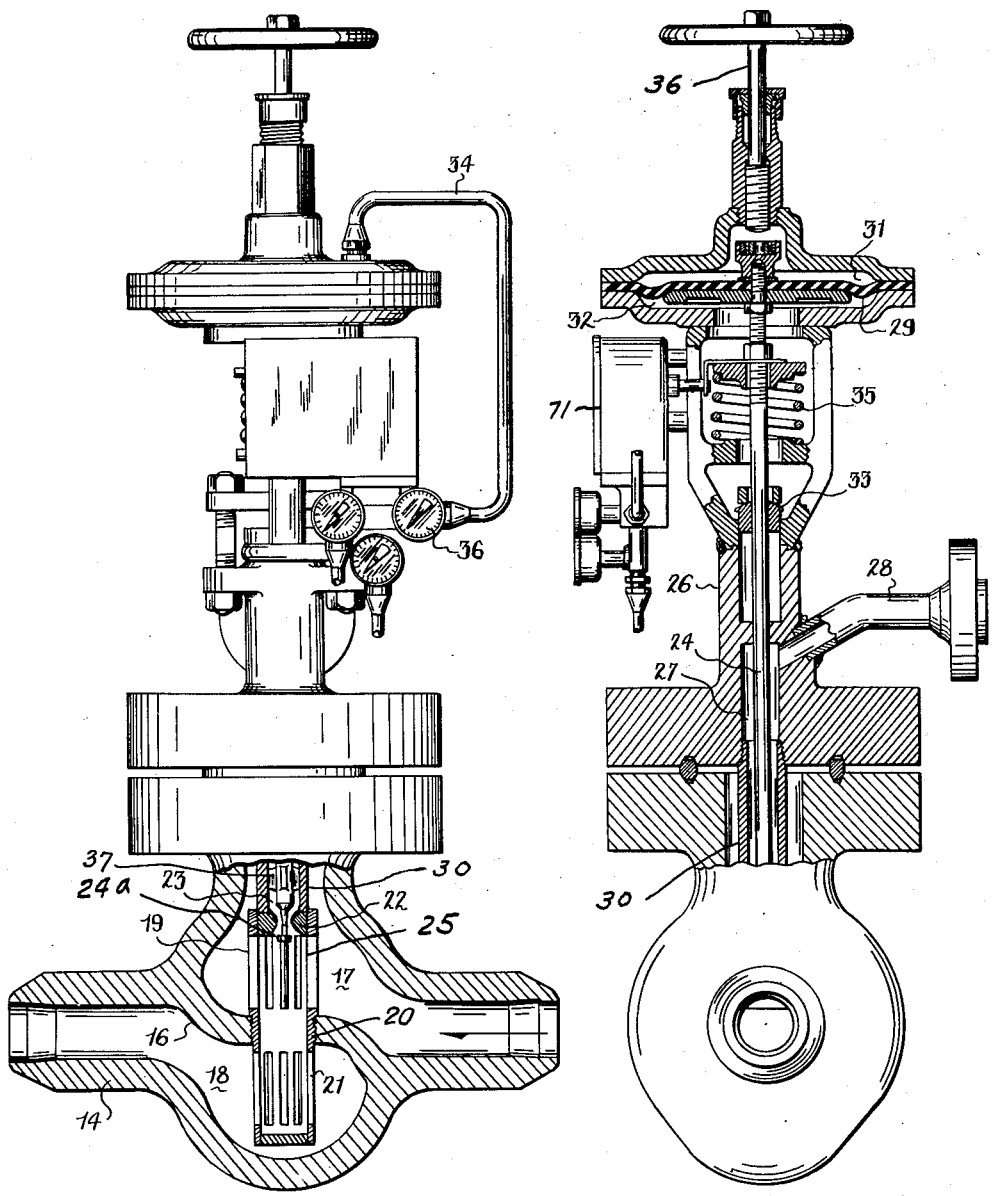

2,710,745

GAS TEMPERATURE REDUCING DEVICE

Francis W. Bunting, Erie, Pa., assignor to Continental Foundry and Machine Company, East Chicago, Ind., a corporation of Delaware Application May 31, 1952, Serial No. 291,005

4 Claims. (Cl. 261—115)

This invention relates to gas temperature reducing devices for gas supply systems, and more particularly to devices of this type primarily adapted to desuperheat steam by improved means of injecting or spraying water into the system.

I am aware that desuperheating devices or arrangements have been widely used since the use of superheated steam became common. For various well known reasons it is desirable to desuperheat or cool superheated steam whereby it is more adaptable for use in turbo-generators, paper making, chemical processes and to bring steam within the pressure and temperature limitations of older equipment. Also, I am aware that it has previously been suggested to spray water directly into steam for cooling the same. However, as steam temperatures have increased additional care has been required to provide safe operation. With steam at about 1000° F. the piping and associated equipment is almost hot enough to glow in the dark and spraying water into such hot lines may chill the pipe and induce damaging thermal stresses. To avoid such difficulties the pipe is often lined with an inner sleeve, usually stainless steel, which is a relatively expensive procedure. Among other objects the present invention is adapted to eliminate the necessity for expensive pipe liners or shock sleeves downstream from the desuperheater unit.

According to the invention, a pressure vessel is inserted in the superheated steam line having a body generally similar to a conventional steam control valve in that the incoming steam or gas is directed over a division wall, through a port, and under the wall to a delivery conduit. A generally cylindrical thermal shock cage is mounted in the port and is provided with longitudinal slots above and below the division wall. A valve at the top of the cage is adapted to direct water into the cage at high velocity in response to temperature demands thereby providing a good spray to mix with the steam or gas which is turbulently directed into the cage through the slots. This results in an efficient admixture of steam and water to desuperheat or cool the steam passing to the delivery conduit through the lower cage slots. The valve controlling the flow of cooling water is within the upper part of the cage structure to insure that at light loads a sufficient flow of cooling water will occur to effect the desired cooling. In the event of damage the cage can be removed and replaced relatively easily.

Although the invention will be described in connection with a steam supply system wherein it is employed to desuperheat steam, it is equally adaptable to various other gaseous supply systems wherein the gas is delivered at relatively high temperatures and it is desired to reduce the gas temperature and supply a gaseous mixture at reduced temperature comprising the delivered gas and a gaseous conversion of the cooling liquid effected by heat exchange. For example, it may be desirable to reduce the temperature of air delivered at 1500° F. by injecting water into the flow stream in accordance with the invention. The water in being transformed into steam absorbs heat and reduces the air temperature and the supply gaseous mixture comprises air and superheated steam.

It is a primary object of the invention to provide improved means for reducing the temperature of a gas delivered to a gas supply system.

Another object of the invention is to provide improved desuperheating means for steam supply systems.

Another object of the invention is to provide a desuperheating device of the water spray type which will avoid thermal shock in the desuperheat steam delivery line thereby avoiding the necessity for expensive liners or sleeves.

Another object of the invention is to provide a desuperheating device adapted to be easily installed in a conventional steam supply system to effect a very efficient admixture of superheated steam and water for cooling the steam.

Another object of the invention is to provide a desuperheater device of the above type having a thermal shock element which can be replaced relatively easily.

Other objects of the invention and the invention itself will become increasingly apparent from a consideration of the following description and drawings wherein:

Figure 1 is a diagrammatic view of a steam supply system embodying the invention.

Figure 2 is an enlarged front elevational view, partially in section, of the desuperheating device illustrated in Figure 1, and Figure 3 is an enlarged side elevational view, largely in section, of the desuperheating device illustrated in Figure 2.

Referring now to the drawings, and particularly Figure 1, I have indicated at 10 a conduit extending from a steam generator (not shown) adapted to deliver superheated steam at variable temperature and pressure conditions such as from 600 p. s. i. at 550° F. to 1500 p. s. i. at 1000° F. Conduit 10 connects with the body 11 of a conventional control valve and superheated steam is delivered through a conduit 12 to a desuperheating device generally indicated at 13. The device 13 which is the essential part of the present invention comprises a preferably cast pressure vessel 14 having a division wall 16 providing an upper chamber 17 communicating with the superheat steam inlet conduit 12 and a lower chamber 18 communicating with a desuperheat steam delivery conduit 39. It is understood that vessel 14 may be fabricated or built up in construction as well as cast. Wall 16 has a central port or opening for receiving a thermal shock cage generally indicated at 19. Cage 19 is generally cylindrical in form and has a central threaded portion 20 to engage the threaded opening in wall 16 with an annular shoulder on the cage seating against the top surface of the wall. Circumferentially spaced longitudinal slots 21 are provided in cage 19 beneath wall 16 and similar slots 25 are formed in the cage above wall 16.

The lower end of cage 19 is closed and the upper end is open and has a tubular extension or spray barrel 30 detachably telescoped therein which is formed to provide a frusto-conical valve seat 22 adapted to co-operate with a frusto-conical valve 23 formed on a valve stem 24 to control flow of cooling water into cage 19. Valve 23 comprises an upper tapered portion conforming in slope to seat 22, a lesser tapered portion adapted to effect a needle type flow control with seat 22, and a reduced diameter cylindrical portion terminating in an enlarged head or target 24a.

The valve stem 24 is preferably provided with centering ribs 37 adjacent the valve 23 adapted to make sliding engagement with the inner wall of barrel 30. Barrel 30 is preferably threadedly secured to the bonnet 26 of the superstructure with the bonnet and pressure vessel 14 being adapted to be secured together in a conventional manner by providing co-operating flanges, a sealing ring therebetween, and fastening bolts. Bonnet 26 is formed to provide a tubular chamber 27 surrounding stem 24 and communicating with barrel 30. A cooling water supply line 28 communicates with the upper portion of chamber 27. Valve stem 24 is secured to the diaphragm 29 of a fluid pressure motor having an upper chamber 31 adapted to receive fluid under variable pressure and a lower chamber 32 open to atmospheric pressure. The valve stem 24 is sealed with bonnet 26 in a conventional manner as indicated at 33. A fluid pressure line 34 communicates with upper chamber 31 and the amount of movement of stem 24 in a valve closing direction for a given fluid pressure in chamber 31 can be regulated by adjustment of a compression spring 35. A threaded shaft 36 operable by a hand wheel is adapted to engage the upper end of valve stem 24 and move the stem in the event of motor fluid failure or to provide a maximum opening stop for the valve controlling flow of cooling water to cage 19 as a further precautionary measure in the event of sudden pressure failure.

The cooling water line 28 connects with a control valve 38 which from a line 40 receives water at temperature of the available supply and under pressure in excess of the initial steam pressure in vessel 14, for example, at 150 p. s. i., in excess of such pressure. Valve 38 is controlled by fluid pressure and in the event of fluid failure I preferably provide a by-pass 41 for controlling flow of cooling water with suitable manually operable shut-off valves. Since the cooling water pressure must always be in excess of the steam pressure, I provide the valve 38 comprising power operator 45 actuated by a differential controller 43 through a conventional pilot valve. A line 42 extends from steam conduit 12 to one side of a spring loaded diaphragm in controller 43, and a line 44 extends from water line 28 to the other side of the diaphragm, thus measuring and controlling differential pressure across valve 23. Power operator 45 is equipped with a four way pilot valve, mechanically linked to and influenced by an external lever of controller 43. Valves of this type are well known and only a brief description is given herein. A line 46 has a normally closed valve therein which may be opened to balance pressure across the controller diaphragm.

The valve body 11 is part of a conventional steam flow control valve generally indicated at 48 wherein the valve is operated by a piston under the control of a pilot valve and the pilot valve position is influenced by a fluid pressure motor operable by variable air pressure through a line 49 in response to varying steam demands of the system. Air pressure supply line 49 extends from the fluid pressure motor of valve 48 to the connection box 51 of a conventional pressure recorder-controller 52 which receives air under pressure such as 100 p. s. i. from a main supply line 54 through a line 53. A conventional reducing valve 56 and air filter 57 is inserted in line 53.

In a similar manner a conventional temperature recorder-controller 58 receives air under pressure from line 54. Air from line 54 is delivered through a line 50, strainer 60, filter 57, and line 55 to line 70 communicating with the pilot valve of valve 48 and line 47 communicating with the four way pilot valve in command of the power actuator 45 for valve 38. A line 61 extends from a temperature bulb 62 in desuperheated steam delivery conduit 39 to temperature controller 58. The bulb 62 is located at a zone 65 sufficiently downstream of the desuperheater device to give an accurate indication of the final steam temperatures and pressure desired. For example, at a zone such as 65 in the system it may be desired to receive steam under controlled conditions varying from 1500 p. s. i. at 1000° F. to 450 p. s. i. at 460° F. A steam pressure line 63 leads from this zone to pressure controller 52.

The operation of the system will now be described. Assume the pressure controller is set to deliver a desired steam pressure at zone 65. The actual pressure at zone 65 will be transmitted to pressure controller 52 and dependent upon the variation from the desired pressure the controller 52 will regulate the air pressure from line 54, line 49 and the fluid pressure motor associated with valve 11 until the desired steam pressure is achieved. However, the steam will probably not be at the desired temperature and the temperature controller 58 will regulate the air pressure in line 59, preferably leading to a conventional positioner 71, and then through line 34 to chamber 31 to change the position of valve 23 and resultantly the flow of cooling water.

It will now be understood that superheat steam may be introduced into upper chamber 17 of vessel 14 under varying pressure and temperature conditions and will turbulently enter cage 19 through upper slots 25 where it will efficiently mix with cooling water in spray form entering the top of the cage under control of valve 23. The high velocity cooling water entering the upper portion of cage 19 will strike the target head 24a at the lower end of valve stem 24 which assists atomization of the water. The cooled or desuperheated steam will pass through the lower cage slots 21 to lower chamber 18 and thence to delivery conduit 39. It will be apparent that cage 19 takes the thermal shocks or stresses induced by spraying cooling water into superheated steam and since only cooled or desuperheated steam flows through conduit 39 there is no necessity for lining this conduit with expensive stainless steel or the like sleeves. Further, it will be noted that the cooling water control valve 23 is disposed at the lower portion of barrel 30 and at the upper end of cage 19.

The barrel 30 slidingly telescopes into the upper end of cage 19 whereby upon removal of the flange bolts (not shown) the superstructure including the barrel 30 can be lifted from vessel 14 to expose cage 19. Cage 19 can then be removed by unthreading from wall 16 and replaced if required. Valve seat 22 is preferably formed of relatively hard steel welded to barrel 30.

Although the invention is particularly adapted to a steam supply system and has been described in connection with such a system it will be understood that it is adaptable to systems employing a gas other than steam. For example, if air at high temperature such as 1500° F. is delivered under suitable pressure through conduit 10, control valve 11, and conduit 12 to device 13 and it is desired that the air delivered from conduit 39 be at a reduced temperature, the apparatus will function in the same manner as though superheated steam was being supplied through conduit 10. Of course, the air at reduced temperature in conduit 39 will be mixed with superheated steam due to heat exchange between the high temperature air and cooling water effected within device 13.

I wish it to be understood that I do not desire to be limited to the exact details of construction shown and described, for obvious modifications will occur to persons skilled in the art.

What I claim is as follows:

1. A desuperheating device for steam supply systems comprising a pressure vessel adapted to be connected to a superheated steam inflow line and a desuperheated steam outflow line, the pressure vessel having a ported dividing wall therein, a generally tubular thermal shock cage mounted in said wall and extending therefrom in both directions, said cage having ports at one side of said wall for receiving superheated steam and ports at the opposite side of said wall for exhausting desuperheated steam, a temperature responsive valve disposed at one end of the cage for directing a spray of cooling water under high velocity into the cage, and the superheated steam entry ports comprising elongate slots in said cage disposed between the dividing wall and the valve adapted to turbulently direct superheated steam into the cage.

2. The desuperheating device as described in claim 1 and wherein a tubular spray barrel adapted to be connected with a source of cooling water under high pressure extends from the superheated steam ports side of the cage, the valve comprising a frustoconical valve seat at the juncture zone of the cage and spray barrel, and a cooperating valve element having a frustoconical portion to engage said seat merging with a reduced generally tapered portion normally projecting through said seat whereby a needle valve control of the cooling water may be effected as the valve is axially moved.

3. The desuperheating device as described in claim 1 and wherein the cage is threadedly mounted in the dividing wall, a superstructure including means for operating the valve being detachably mounted on the pressure vessel, and the cage being replaceable upon removal of the superstructure.

4. A desuperheating device for steam supply systems comprising a pressure vessel adapted to be connected to a superheated steam inflow line and a desuperheated steam outflow line, the pressure vessel having a ported dividing wall therein, a generally tubular thermal shock cage mounted in the dividing wall and extending in both directions therefrom, said cage having elongate ports at one side of said wall for turbulently directing superheated steam into the cage and similar ports at the opposite side of said wall for exhausting desuperheated steam, a valve at the superheated steam port end of the cage adapted to be connected to a source of cooling water under high pressure for directing cooling water spray into the cage, and means mounted on the pressure vessel for controlling said valve.

References Cited in the file of this patent

UNITED STATES PATENTS

| | | | |
|---|---|---|---|
| 1,136,211 | Collin | Apr. 20, | 1915 |
| 1,787,790 | Mastenbrook | Jan. 6, | 1931 |
| 1,894,391 | Barrett et al. | Jan. 17, | 1933 |
| 1,894,696 | Lindemann | Jan. 17, | 1933 |
| 1,969,504 | Fraser | Aug. 7, | 1934 |
| 1,999,116 | Sidney | Apr. 23, | 1935 |
| 2,138,064 | Howell | Nov. 29, | 1938 |
| 2,355,458 | Mastenbrook | Aug. 8, | 1944 |
| 2,610,837 | Puster | Sept. 16, | 1952 |